United States Patent Office 3,355,664
Patented Nov. 28, 1967

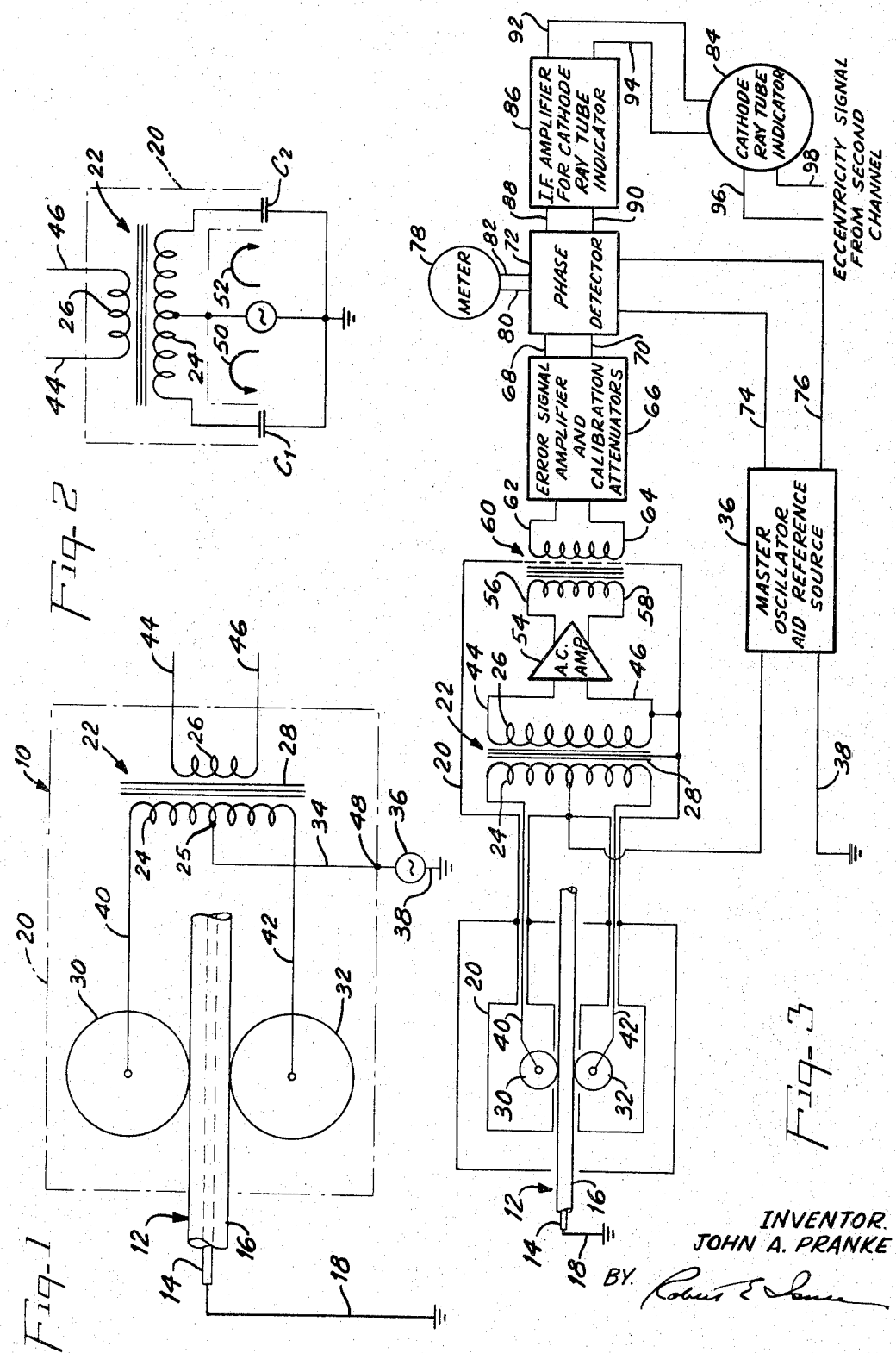

3,355,664
APPARATUS FOR MEASURING INSULATION THICKNESS OF COATED CONDUCTORS
John A. Franke, Rome, N.Y., assignor to Rome Cable Corporation, Rome, N.Y., a corporation of Delaware
Filed June 12, 1964, Ser. No. 374,763
1 Claim. (Cl. 324—61)

This invention relates to eccentricity measuring devices and more particularly to an improved electrical system and method for determining the position of a conductor with respect to insulation therearound.

In the manufacture of electrical wire and cable, dielectric materials are used to cover a metallic conductor to provide insulation and/or mechanical protection. Such dielectrics may be applied by a number of methods including dipping, wrapping or extrusion or combinations of the same. In all cases, however, it is desirable to establish and maintain concentricity of the conductor in the insulating sheath or coating to insure optimum mechanical and electrical performance as well as to afford economic use of raw materials.

Difficulty in establishing and maintaining concentricity during fabrication of an insulated conductor normally results from the inadvertent introduction of variables during the run. Such variables can include changes in temperature, machine pressures, die location and other factors. Since such variables are introduced during a run, it is necessary, if one is to correct for the errors resulting therefrom, that a method of continuously measuring concentricity be provided.

In the past, attempts have been made to utilize capacitive type measuring units to measure and compare insulation thickness on opposite sides of the conductor to effect a continuous measurement of concentricity.

However, such units have generally proved to be unreliable because of sensitivity to environmental conditions such as the presence of dirt and moisture and moreover are of limited utility because of an inability to operate under water.

One of the objects of this invention is to provide an improved apparatus and method for continuously measuring departures in the concentricity of a conductor in an insulating sheath.

A further object is to provide an apparatus and method for continuously measuring the concentricity of a conductor within a covering of insulation and which avoids or minimizes one or more of the difficulties mentioned above.

Another object of the invention is to provide a device and method for measuring concentricity of a conductor within an insulation sheath which is capable of operation under water.

A further and more specific object is to provide, in such device and method, improved guard circuit means for eliminating stray currents to ground and to avoid the effect of such currents on the measuring electrodes.

Another object is to provide in such device means rendering the circuit relatively insensitive to the shunting effect of environment such as water or steam.

A further object is to provide a device and method for the stated purpose which is relatively simple and reliable.

Another object is to provide, in such device and method, means for visually indicating the amplitude and direction of eccentricity of a conductor within an insulating sheath.

In carrying out the invention, in a broad aspect thereof, a high frequency voltage source is connected to the center tap of a transformer primary, the opposite ends of which are connected through electrodes to opposite sides of the cable insulation. The cable conductor is connected to the grounded side of the voltage source. A guard shield is connected to the primary winding center tap and the transformer secondary is magnetically coupled to the primary winding through a common core, to provide an output signal indicative of the positional relationship of the conductor relative to the electrode elements and hence indicative of the eccentricity of the conductor relative to the insulation sheath.

The novel features of this invention are set forth with particularity in the appended claim. The invention itself, however, both as to its organization and method of operation together with further objects and advantages thereof, may best be understood by reference to the following description taken in connection with the accompanying drawings, in which:

FIGURE 1 is a schematic diagram of a device embodying the invention and capable of producing a continuous electrical signal indicative of the positional disposition of a conductor in an insulated cable as the cable is run through the device;

FIGURE 2 is a simplified electrical diagram used to explain the operation of the device of FIGURE 1, and;

FIGURE 3 is a schematic diagram of a device incorporating the invention and including one preferred form of readout means for visually indicating the degree and direction of eccentricity of the conductor within the covering insulation of a cable passing through the device.

Referring to FIGURE 1 of the drawings, 10 generally indicates a measuring device constructed in accordance with the invention and through which a cable 12 to be tested is being continuously fed. The cable 12 includes a conductor 14 and insulating sheath 16, the conductor 14 being grounded as indicated at 18.

The measuring device 10 comprises a surrounding guard shield indicated by the dot-dash lines 20, a pair of rotary type electrodes 30 and 32 mounted to engage diametrically opposite sides of the cable 12 as it passes through the device 10, and a transformer 22, having a center tapped primary winding 24, a secondary output winding 26 and a common core 28.

The primary winding 24 of the transformer 22 is energized through a conductor 34 connected to the center tap 25 thereof and to the output side of a signal generator 36 adapted to provide alternating current of suitable frequency and amplitude. The other terminal of the signal generator 36 is grounded as indicated at 38. The opposite terminal ends of the transformer primary are connected respectively by conductors 40 and 42 to the electrodes 30 and 32 to complete the circuit from the output side of the signal generator 36 back to ground. Output voltage is obtained from conductors 44 and 46 connected to opposite ends of the transformer secondary winding 26. The guard shield 20 is electrically connected, as at 48, to the output line 34 from the high frequency voltage source 36.

In the arrangement as thus far described, the resultant electrical circuit basically comprises the form shown in FIGURE 2 in which capacitors $C_1$ and $C_2$ represent the capacitive effect of the cable insulation disposed intermediate the conductor 14 and the respective electrodes 30 and 32. The capacitors $C_1$ and $C_2$ together with the halves of the transformer primary on each side of the center tap 25 form a bridge circuit in which the current flows in opposed relation through each of the halves of the transformer primary during each half-cycle of the signal voltage as indicated by the arrows 50 and 52. When the grounded conductor 14 is perfectly centered within its insulation sheath 16, the capacitive reactance effects provided by current flow through capacitors $C_1$ and $C_2$, will be equal and the current flowing through each primary winding half will be equal. Thus, since the electrodes 30 and 32 are connected to the primary winding 24 in phase opposition, the net flux in the common core 28 will be zero and the output of the transformer secondary 26 will be zero, thereby indicating a centered condition of the conductor 14 within the insulation 16.

However, should the equality of thickness of the insulation intermediate the conductor 14 and each of the electrodes change in any way, the difference between the capacitances to ground of such electrodes will change as will the magnitudes of the currents flowing in each half of the transformer primary, resulting in an unbalance and in the generation of a net flux within the transformer.

The result of such unbalance will be the generation of an induced signal in the transformer secondary winding 26, which will have an amplitude which is essentially proportional to the difference between the insulation thickness disposed intermediate the conductor and the respective electrodes and which will have a phase, relative to the generator, which is indicative of the direction of the departure of the conductor from concentricity.

In the described unit it will be apparent that, in the absence of any grounded material within the guard shield, no net current will flow in the transformer primary in the absence of capacitive unbalance because the currents flowing in each electrode circuit are in phase opposition. As such, each electrode and primary winding terminal end will be at substantially the same potential. They will also be surrounded by the guard shield, which is maintained at the same potential as the center tap of the transformer. Under such conditions, any stray currents that might exist due to potential differences resulting from environmental effects within the guard shield would be limited to negligible values of a magnitude markedly less than that of the error signals. As such, the subject unit may be used to measure concentricity and departures therefrom irrespective of the environment surrounding the measuring head. The measuring head may thus be filled with any medium, such as air, steam, water, etc., since any such medium will be maintained effectively at guard shield potential and, hence, will prevent the existence of potential differences of any appreciable magnitude that might serve to cause an unbalanced situation that would induce a differential current flow in the transformer primary.

The above is of considerable importance in an extrusion process, for example, where it is necessary to water cool the applied insulation immediately after the cable exists from the die. In such installation, it is not possible to wipe sufficient moisture or other extraneous material from the insulation on rapid runs of material to avoid the presence of residual dampness or extraneous material thereon which will effect erroneous indications on conventional units if not render the same inoperable. Such is also the case in continuous run vulcanizing processes where the applied insulation material is subject to an environment of live steam which materially affects the operability of conventional units.

Although the secondary winding of the transformer 22 may be connected to any suitable detection circuit to amplify the output signal and to indicate, in response to its magnitude and phase, the degree and direction of eccentricity of the conductor 14 within the insulation 16. FIGURE 3 illustrates one preferred embodiment of an output detection circuit as incorporated in a measuring instrument embodying the principles of this invention. As there shown, the same basic sensing or measuring circuit is employed as was shown and described in conjunction with FIGURES 1 and 2. Here, however, the guard shield has been modified to form separate portions for each roller electrode and to completely encompass the bridge transformer 22 and a portion of a preamplifier circuit to be described as well as to environmentally enclose the entire sensing electrode system. The shape of the shield, of course, will be tailored to the equipment being used. As indicated, it is preferred to have the secondary of the bridge transformer 22 operate at guard reference potential. Such may be conveniently effected by connecting the secondary and transformer core to the guard shield 20.

Again considering FIGURE 3, the output from the secondary 26 of the bridge transformer 22 is fed by conductors 44 and 46 to a suitable alternating current preamplifier 54 and the amplified output thereof is applied by conductors 56 and 48 across the primary winding of an isolation transformer 60. The output signal from the secondary of the isolation transformer 60 is fed by conductors 62 and 64 to a main error signal amplifier 66. In the illustrated circuit, the isolation transformer 60 permits a return of the desired error signal from a reference plane of the guard potential to a reference plane of ground potential on the output of the secondary windings thereof and thus permits grounded operation of subsequent electronic components. However, if an adequately shielded bridge transformer were employed, it would be possible to operate the secondary of the transformer at ground potential and eliminate the need for a guarded preamplifier. At the present the method shown is preferred.

The amplified output of the error signal amplifier is fed by conductors 68 and 70 to a phase detector 72. The necessary reference signal for the phase detector is obtained from the signal generator 36 through conductors 74 and 76. If desired, an indicating meter 78 may be conveniently connected by lines 80 and 82 to the phase detector 72 to visually indicate the amplitude and nature of detected current. Since the phase of the error signal switches by 180° dependent upon which electrode has the larger signal, the phase detector 72 is able to determine the direction of the differential in insulation thickness.

If desired, the meter 78 can be readily adapted to read directly in percentage eccentricity of the conductor in the cable by calibrating the gain in the system. This modification can be accomplished by providing suitable switching to temporarily connect the roller electrodes 30 and 32 in parallel to the end of one half of the bridge transformer primary winding 24. Since the capacitive current flowing from each roller to the grounded conductor 14 is essentially proportional to the insulation thickness, referred to as $T_1$ and $T_2$, connecting the rollers in parallel yields a current which is essentially proportional to the sum of the two insulation thickness $T_1$ and $T_2$ under the rollers. Simultaneously with switching the roller electrode connections, the gain of the amplifier may be reduced by a known amount with a fixed attenuator, and an adjustable attenuator may be used to set the gauge to indicate the desired eccentricity sensitivity. Thus in this operation, the gauge would indicate the sum of the wall thicknesses $T_1$ and $T_2$ which may be taken as 100% reading on the indicating meter 78. When the rollers are switched back to normal operation with the rollers connected to opposite ends of the bridge transformer primary 24, the meter indicates the difference in thickness between $T_1$ and $T_2$. Percent eccentricity is defined as $$\frac{T_1-T_2}{T_1+T_2}\times 100$$

Hence, by setting the gain of the circuits with the $T_1+T_2$ signal suitably attenuated, the device may readily be made direct reading in percent eccentricity in normal operation.

Referring again to FIGURE 3, the indicating system may be carried one step further to obtain a continuous visual picture of the conductor 14 within the insulation 16 by providing a cathode ray tube indicator 84 and a suitable D.C. amplifier 86 for the same. In such a unit, the signal output of the phase detector 72 is fed by conductors 88 and 90 to the amplifier 86 which serves to raise the signal to a level sufficient to deflect the cathode ray tube. The amplifier unit 86 may also include a sweep current to provide a sweep signal to generate a circular sweep representative of the conductor on the screen of the cathode ray tube. Conductors 92 and 94 feed the output of the amplifier 86 to the cathode ray tube 84.

With the apparatus as thus far described and shown in FIGURE 3, eccentricity may be determined only in one plane across the cable section. In order to display a complete picture of conductor location within the insulation on the cathode ray tube, a second set of electrodes (not shown) positioned to measure in a plane rotated 90° from the electrodes 30 and 32 and a second measuring circuit identical to that shown in FIGURE 3 and described above is provided to send a second channel signal into the cathode ray tube. Conductors 96 and 98 are intended to indicate leads from the second circuit channel to the cathode ray tube 84. Since the second channel circuit and associated electrodes are the same as the first circuit shown in FIGURE 3 and described above, the circuit has not been duplicated in the drawings in the interest of clarity and brevity. Thus, with one set of electrodes to measure eccentricity across one diameter of the cable and another set to measure across a diameter 90° removed from the first to provide, for example, vertical and horizontal measurements, and with the respective signals of the two channels connected to the vertical and horizontal deflection plates of the cathode ray tube, the resultant visual display is a true picture of the conductor location within the insulation.

It is apparent then from the above that the device in accordance with the subject invention provides at least all of the objects and advantages recited hereinbefore and results in an improved apparatus and method for continuously indicating the magnitude and direction of eccentricity of a conductor within an insulation as the cable is run through the measuring device.

It will now be apparent from the foregoing that in the subject device the bridge transformer is not simply used as a means for coupling an unbalance or differential voltage to subsequent electronic circuitry, but functions through the mutual coupling of the halves of the primary and of the secondary to actively participate in the development of an error signal. It will now also be apparent that the maintenance of the bridge transformer primary, the guard shield and the electrodes at the common signal generator output potential permits operation substantially independent of environment and as such permits operation in an environment of water or steam without the false readings which would otherwise result.

While the present invention has been described by reference to particular presently preferred embodiments thereof, it will be understood that this is by way of illustration of the principles involved and that those skilled in the art may make modifications in the arrangement and mode of operation. Therefore, it is contemplated by the appended claim to cover any such modifications as fall within the true scope of the invention.

I claim:

An electrical system for measuring the eccentricity of an insulating sheath on an electrical conductor with the latter disposed at substantially ground potential, comprising a pair of electrodes mounted to engage diametrically opposed portions of the sheath, a bridge transformer having a center tapped primary, a secondary and a common core, means for generating an alternating signal having an output terminal and a second terminal connected to ground, means for electrically connecting the center tap of said transformer primary to the output terminal of said signal generator, means electrically connecting said electrodes respectively to opposite ends of said primary to incorporate halves of said primary as integral current balancing elements in the resultant bridge circuit comprising said primary and the said opposed portions of the sheath and to produce in said secondary a net electromotive force indicative of unequal thickness of said opposed sheath portions when such condition exists, indicating meter means displaceably responsive to the magnitude of current flow in said secondary winding for providing a visual indication thereof, means for selectively connecting said electrode elements in parallel to one end of said primary winding, gain attenuating means connected in circuit intermediate said transformer secondary and said indicating means for biasing the displacement of said indicating means to a predetermined value when said electrode elements are connected in parallel to one end of said primary winding whereby said meter means visually indicates perecentage eccentricity when said electrodes are reconnected respectively to the opposite ends of said primary.

References Cited

UNITED STATES PATENTS

| | | | |
|---|---|---|---|
| 2,417,062 | 3/1947 | Coake | 324—61 |
| 2,471,560 | 5/1949 | Everson et al. | 324—54 |
| 2,509,621 | 5/1950 | Willoughby | 73—398 |
| 2,589,758 | 3/1952 | Wojciechowski | 324—57 |
| 2,711,590 | 6/1955 | Wilcox | 324—61 |
| 2,718,620 | 9/1955 | Howe | 324—61 |
| 2,721,975 | 10/1955 | Wojciechowski | 324—61 |
| 2,992,392 | 6/1961 | Haynes | 324—61 |

FOREIGN PATENTS

| | | |
|---|---|---|
| 938,623 | 1/1956 | Germany. |
| 797,399 | 7/1958 | Great Britain. |
| 872,855 | 7/1961 | Great Britain. |
| 938,099 | 9/1963 | Great Britain. |

OTHER REFERENCES

Harris: Electrical Measurements, "The Wheatstone Bridge," 1952, New York, John Wiley and Sons, p. 258.

RUDOLPH V. ROLINEC, *Primary Examiner.*

WALTER L. CARLSON, *Examiner.*

E. E. KUBASIEWICZ, *Assistant Examiner.*